United States Patent [19]
Sasian-Alvarado

[11] Patent Number: 5,153,778
[45] Date of Patent: Oct. 6, 1992

[54] POWERLESS FIELD-CORRECTIVE LENS

[75] Inventor: Jose M. Sasian-Alvarado, Naperville, Ill.

[73] Assignee: AT&T Bell Laboratories, Murray Hill, N.J.

[21] Appl. No.: 717,439

[22] Filed: Jun. 19, 1991

[51] Int. Cl.⁵ .............................................. G02B 3/08
[52] U.S. Cl. .................................. 359/742; 359/743; 351/161; 351/177
[58] Field of Search ....................... 359/742, 743, 565; 351/161, 177

[56] References Cited

U.S. PATENT DOCUMENTS

| | | | |
|---|---|---|---|
| 3,592,530 | 7/1971 | Klein | 350/216 |
| 4,449,792 | 5/1984 | Arai et al. | 350/432 |
| 4,606,606 | 8/1986 | Freeman | 350/145 |
| 4,637,697 | 1/1987 | Freeman | 359/742 |
| 4,668,056 | 5/1987 | Braat et al. | 350/432 |
| 4,764,806 | 8/1988 | Altman | 358/60 |
| 4,772,107 | 9/1988 | Friedman | 350/463 |
| 4,846,552 | 7/1989 | Veldkamp et al. | 359/572 |
| 4,906,061 | 3/1990 | Yamaguchi | 350/6.3 |
| 5,073,007 | 12/1991 | Kedmi et al. | 359/742 |

OTHER PUBLICATIONS

"The Kinoform: A New Wavefront ...", *IBM J. Res. Develop.*, Mar. 1969, L. B. Lesem et al., pp. 150–155.
"Aberrations of curved zone plates ...", *Applied Opt.*, vol. 16, No. 6, Jun. 1977, W. A. Kleinhans, pp. 1701–1704.
"Thickmeniscus field correctors", *Applied Opt.*, vol. 21, No. 15, pp. 2799–2803.

Primary Examiner—Janice A. Howell
Assistant Examiner—Kiet T. Nguyen
Attorney, Agent, or Firm—Wendy W. Koba

[57] ABSTRACT

A optical lens is disclosed which is capable of correcting for imaging system characteristics such as field curvature and spherical aberration. The corrective lens comprises a single optic device and imparts no additional power into the optical system. In particular, the corrective lens comprises a plano-based device (either plano-concave or plano-convex) including a series of stepped zones where the steps are formed to be parallel/perpendicular to the plano surface of the device. The stepped profile of the corrective lens is determined to approximate a lens curvature R which will impart a curvature to the wavefront passing therethrough to essentially cancel selected inherent imaging system aberrations. In particular, a corrective lens of the present invention may be utilized to correct for field curvature, spherical aberration, or both. The corrective lens of the present invention may be formed to be either transparent or reflective, depending upon system requirements.

20 Claims, 7 Drawing Sheets

POWERLESS FIELD-CORRECTIVE LENS

BACKGROUND OF THE INVENTION

1. Technical Field

The present invention relates to a powerless lens design capable of correcting for optical characteristics such as field curvature and spherical aberration.

2. Description of the Prior Art

In the design of any lens that will cover a finite field of view on a flat image surface, the most problematic aberration to correct, without sacrificing image quality or lens simplicity, is field curvature. Field curvature may be introduced into an optical imaging system as the incoming optical beam moves away from the optical axis of the system. So-called "field flattener" lenses have been developed over the years to address this problem. One such field flattener design is discussed in the reference *Optics*, Tenth Edition, M. H. Freeman, Butterworth (1990), in a section entitled "The achromatic doublet", beginning at page 467. The particular design includes a plano-concave field-flattening lens positioned near the image plane of the arrangement and an associated achromatic doublet. Other field-flattening arrangements use a large power lens (often negative) inserted between two lenses (positive) as, for example, in the Cooke triplet. The Cooke triplet has the disadvantage of requiring strong curvatures that introduce large aberrations. The aberrations can be made to somewhat cancel each other, but small amounts may remain.

Spherical aberration is a result of imperfect imaging with a spherical lens. This aberration may be present for both on-and off-axis illumination, since it is a result of deviation of peripheral (marginal) rays with respect to those rays located closer to the optical axis. A negative lens will exhibit negative spherical aberration; a positive lens will exhibit positive spherical aberration. The problem of spherical aberration is often addressed in the prior art by utilizing an achromatic doublet, providing both positive and negative spherical aberrations, such that the net effect is essentially zero.

A problem with any conventional lens arrangement for addressing these and other optical imaging problems is the amount of optical power the arrangement introduces into the imaging system, regardless of whether positive or negative corrective lenses are utilized. Further, the arrangements all require a number of separate optical components, which results in increasing the overall size, complexity and cost of the corrective arrangement. Thus, a need remains in the prior art for a simplified lens arrangement which corrects for characteristics such as field curvature and spherical aberration.

SUMMARY OF THE INVENTION

The need remaining in the prior art is addressed by the present invention which relates to a lens capable of correcting for optical characteristics such as field curvature and spherical aberration and, more particularly to a powerless, non-planar bulk optic component capable of providing the desired field correction.

In accordance with an exemplary embodiment of the present invention, a powerless lens of the present invention comprises a stepped profile which functions to introduce a predetermined phase shift to a waveform passing therethrough. The powerless lens is utilized to re-arrange the incident wavefront train into a plurality of annular wavefront sections. The composite waveform of the plurality of wavefront sections, as controlled by the stepped profile and resultant phase difference, are thereby positioned to exhibit a predetermined curvature which compensates for the selected aberrations of the optical imaging system.

In one exemplary embodiment of the present invention, a lens may be created which compensates for the curvature of field ($\rho$) introduced in an off-axis beam propagating through the imaging system. The stepped profile of the so-called "field flattener" lens is thus designed to approximate a circular curvature R which will yield a field curvature ($\rho$) of opposite sign to the system curvature, thus providing cancellation of the inherent field curvature. In particular, each step of the lens comprises a first face parallel to the plano (i.e., flat) lens surface and a step height S perpendicular to the plano surface so that the arrangement imparts essentially no power into the optical system. In accordance with the field curvature corrective embodiment of the present invention, each step comprises essentially the same step height S, where S is a function of the wavelength of the impinging optical signal and is determined to provide an integral $2\pi$ phase shift to the signal passing therethrough. The total number of steps N, in conjunction with the step size S, determines the fit of the lens curvature R. In particular, as the step size decreases, the number of steps N increases and the approximation to the lens curvature improves.

In one arrangement of the above-described field curvature corrective embodiment, the powerless corrective lens may be optically transparent and utilized as a transmissive device in applications such as, but not limited to, a Schmidt camera, Petzval lens, telecentric relay or microscope objective. Alternatively, the field curvature corrective device may be optically reflective where the surface of each step is coated with a reflective material.

In an alternative embodiment of the present invention, correction for spherical aberration may be provided by modifying the stepped profile of the powerless lens to introduce a corrective factor which would essentially cancel the imaging defocus generated by the spherical aberration. In particular, a spherical aberration correcting powerless lens of the present invention will comprise a stepped profile device where, unlike the "field flattener" lens described above, the step size S will vary across the diameter of the powerless lens to provide a lens curvature R capable of correcting for spherical aberration (i.e., a quartic lens curvature). Further, a powerless corrective lens of the present invention may be configured to cancel both field curvature and spherical aberration by utilizing a particular lens curvature R which is determined by considering both factors.

An advantage of the corrective lens design of the present invention is that essentially no power (i.e., magnification) is introduced into the optical system, since the stepped profile consists of zones which are parallel and perpendicular to the plano surface. Therefore, no significant increase in other aberrations, such as coma and astigmatism, will result.

An additional advantage of the present invention is the relative ease of manufacture of the non-planar device. Since the zones are formed to comprise a stepped profile which is parallel/perpendicular to the flat surface, conventional machining procedures, such as photolithography or diamond turning, may be used to form the powerless corrective lens.

Other and further advantages of the present invention will become apparent during the course of the following discussion and by reference to the accompanying drawings.

BRIEF DESCRIPTION OF THE DRAWING

Referring now to the drawings, where like numerals represent like components in several views.

DETAILED DESCRIPTION

Curvature of an optically imaged field, denoted $\rho$, arises in an optical imaging system when off-axis illumination of the imaging optics is utilized. As the illumination moves further from the optical axis, field curvature increases. The field curvature is a function which depends upon the profile of the lens within the imaging system as can be defined as follows:

$$\rho = K(R - \sqrt{R^2 - y^2}),$$

where y is defined as the distance from the optical axis to a given annular zone and R is the lens curvature. The term K is a constant of proportionality required to form the equality. In association with the teachings of the present invention, a corrective field curvature $-\rho$ thus may be introduced to essentially cancel an inherent field system curvature $\rho$.

Figure 1:
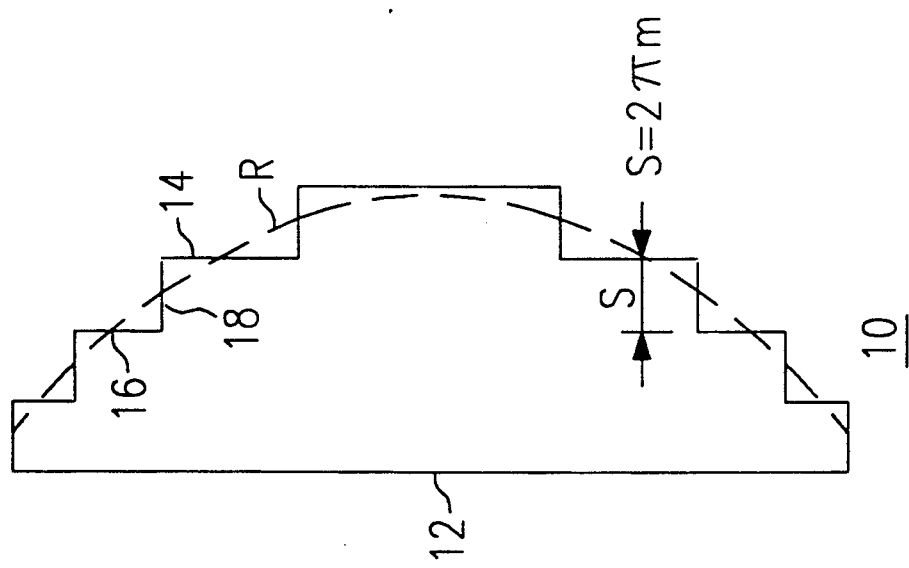
FIG. 1 illustrates, in a side view, an exemplary powerless plano-convex field curvature corrective lens formed in accordance with the present invention.

FIG. 1 illustrates a side view of an exemplary powerless non-planar field curvature corrective lens 10 which is capable of introducing the field curvature required to essentially cancel the inherent system field curvature. As shown, lens 10 includes a flat (i.e., plano) surface 12 and a series of stepped zones 14, building upon plano surface 12 so as to form a stepped profile plano-convex structure. Each zone 14 is configured to comprise a step run 16 parallel to surface 12 and a step rise, or height, 18 perpendicular to surface 12, where this parallel/perpendicular configuration ensures that lens 10 imparts no additional power (i.e., magnification) to the system. The step height S is chosen to provide a $2\pi m$ (m=1,2,3,...) phase shift to the optical wavefront passing therethrough, where field curvature corrective lens 10 is designed so that each step comprises an essentially identical height S. As will be discussed in detail below, there exist applications where the step height S varies across the profile of the device, for example, when correcting for spherical aberration, as discussed above and described in more detail below. However, for arrangements such as that illustrated in FIG. 1 where the only required correction is for field curvature, the step height S will remain essentially constant.

Figure 2:
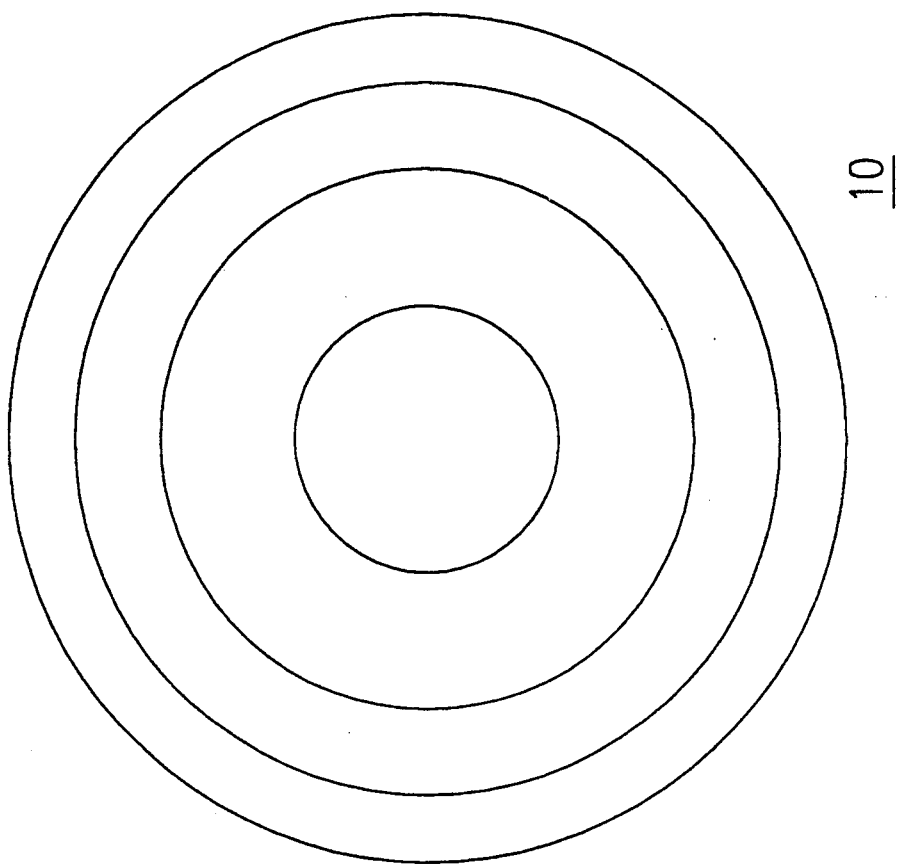
FIG. 2 contains a top view of the plano-convex field curvature corrective lens of FIG. 1.

Utilizing the relationship defined above, the curvature, R, of corrective lens 10 is determined to provide the desired field curvature $\rho$ which will essentially cancel the field curvature present in the optical imaging system. In particular, the match of the stepped profile to the lens curvature R is determined by the number of zones, N, and the phase shift factor $2\pi m$ utilized to determined the step height S. That is, where m=1, the greatest number of steps N will be utilized and the fit to lens curvature R will be most accurate. In particular, the number of zones N will be an integer with a value of at least two, the arrangement of FIG. 1 including a series of four zones. FIG. 2 illustrates a top view of corrective lens 10, indicating in particular the circular design of the various zones 14 forming lens 10, where the diameter of each zone will be a function of the curvature R of lens 10.

Figure 3:
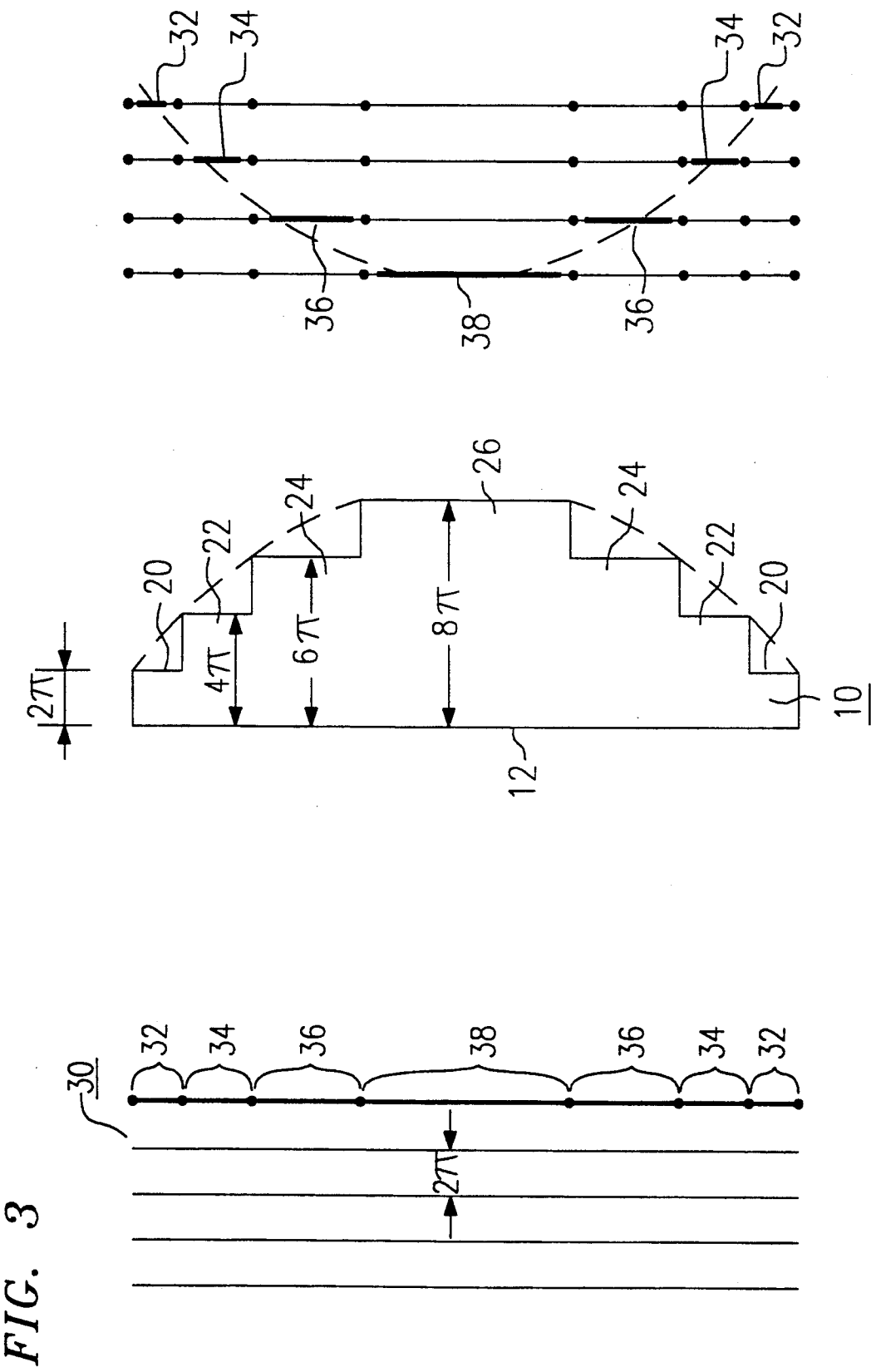
FIG. 3 illustrates the wavefront re-arrangement properties of the powerless field curvature corrective lens of FIG. 1 on a substantially flat wavefront.

FIG. 3 illustrates the wavefront re-arrangement property of plano-convex lens 10 when on-axis illumination is utilized. In particular, corrective lens 10 functions to delay the propagation of central annular region 38 of wavefront 30 relative to the outer annular regions. In particular, the outermost annular section 32 of wavefront 30 passes through a single zone 20 of lens 10, where it experiences a phase shift of $2\pi$ (assuming m=1 for the sake of simplicity). The next annular section 34 of wavefront 30 passes through a pair of zones 20 and 22 and thus experiences twice the phase delay, or $4\pi$. Section 36, as shown in FIG. 3, will propagate through a series of zones 20, 22 and 24 determined to provide a phase delay of $6\pi$ and, finally, section 38 will experience a total phase delay of $8\pi$ as it travels through the maximum thickness of lens 10. The resultant composite waveform, comprising a series of phase delayed annular rings, is illustrated in FIG. 3. As mentioned above, the utilization of an arrangement with essentially parallel and perpendicular step faces results in imparting essentially no power (either positive or negative) into the optical system, where this aspect is critical in the control of various other aberrations.

Figure 4:
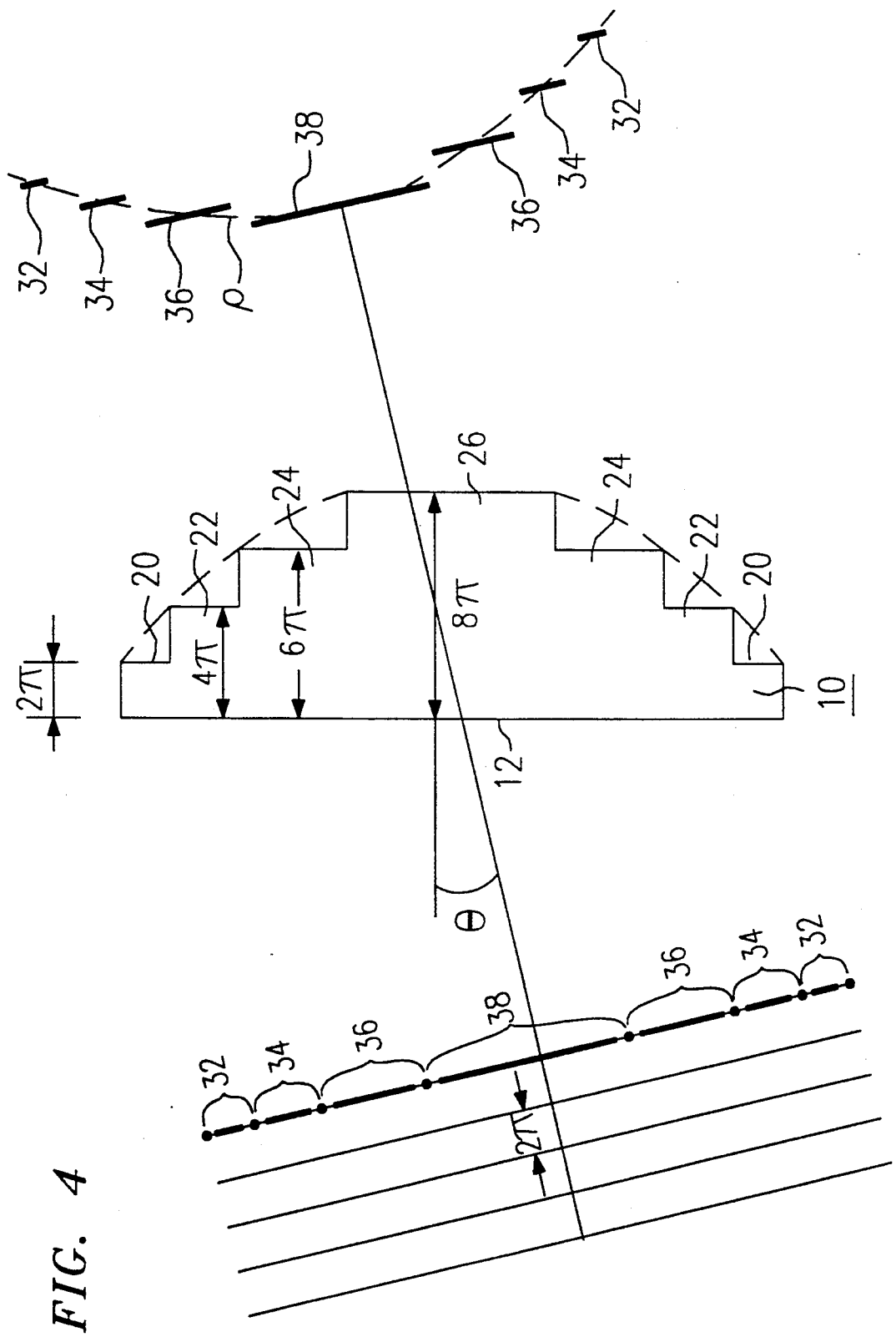
FIG. 4 illustrates the utilization of the exemplary field curvature corrective lens of FIG. 1 to introduce a predetermined field curvature $\rho$ on an off-axis wavefront.

As mentioned above, field curvature is a result of off-axis illumination of the optical imaging system. FIG. 4 illustrates an exemplary arrangement where corrective lens 10 of FIG. 1 is utilized with an off-axis wavefront 30'. The off-axis movement, defined by the angular distance $\theta$, is exaggerated in FIG. 4 for the purposes of illustration. In this example, the off-axis illumination of lens 10 provides a field curvature $\rho$ as shown, for wavefront 30'. Without field correcting lens 10, wavefront 30', when imaged, results in field curvature of $-\rho$ at the exit pupil (not shown). Therefore, the combination of the inherent field curvature $-\rho$ with the induced curvature ρ results in the projection of a relatively flat image at the focal point of the imaging system (not shown).

Figure 5:
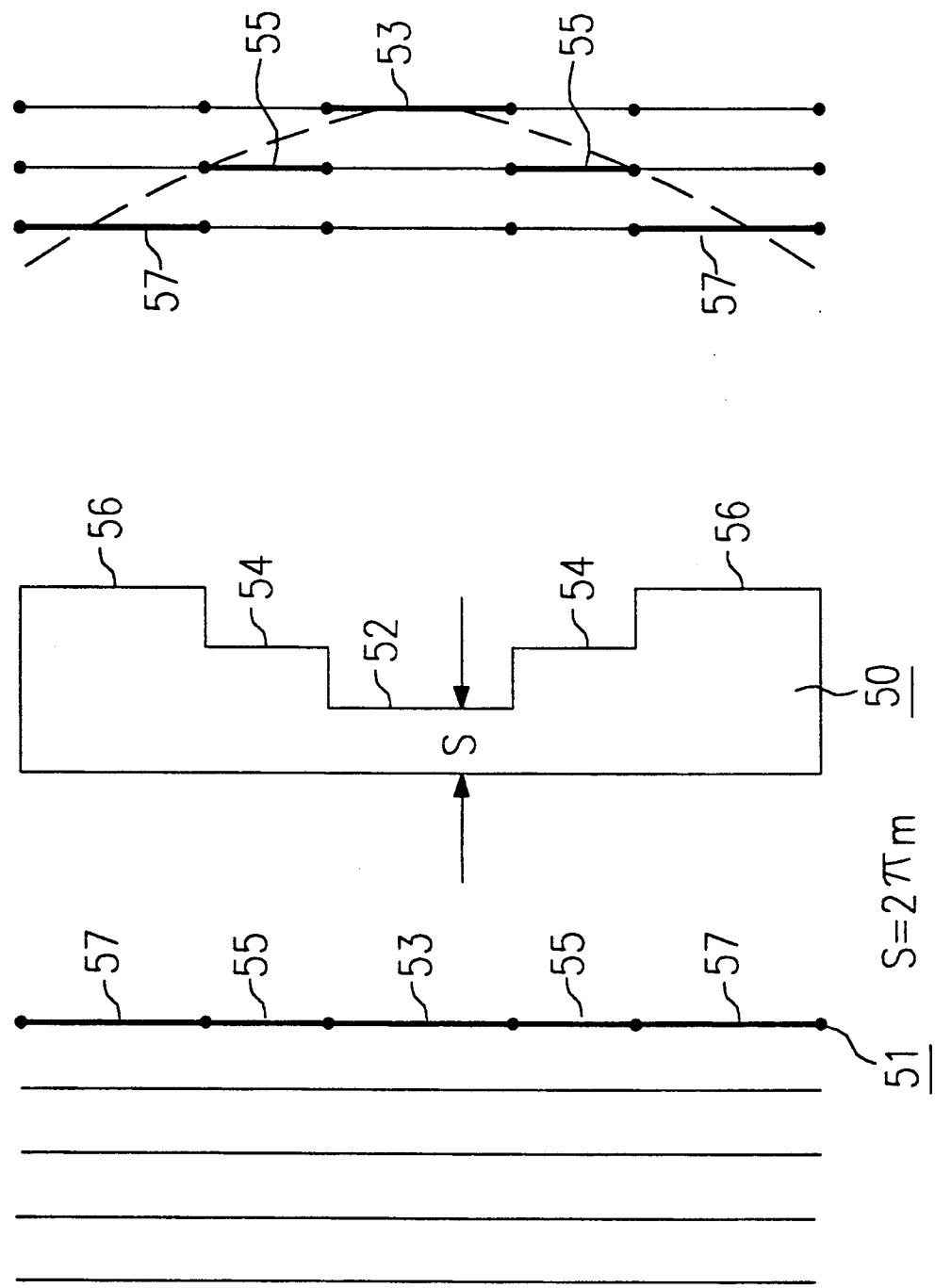
FIG. 5 illustrates the wavefront re-arrangement properties of an exemplary plano-concave field curvature corrective lens formed in accordance with the teachings of the present invention.

A powerless field curvature corrective lens of the present invention may also comprise a plano-concave shape, as shown in arrangement of FIG. 5. Here, lens 50 contains a plurality of zones 52, 54, 56 which are formed to provide an outward lens curvature of radius approximately R which imparts an outward field curvature ρ to the optical wavefront passing therethrough (as opposed to the inward field curvature formed by plano-convex lens 10 of FIG. 1). As with the above plano-convex arrangement, zones 52, 54 and 56 forming lens 50 comprise an essentially identical step height S chosen to provide a 2πm phase shift to the optical wavefront. The number of zones and step size are again directly proportional to the match to the desired lens radius of curvature R. As shown, a plano-concave lens 50 results in transforming a flat on-axis wavefront 51 into a series of annular regions 53, 55 and 57. Plano-concave lens 50 may be utilized in systems which exhibit an inherent inward curvature to provide curvature cancellation and the final projection of an essentially flat image.

Figure 6:
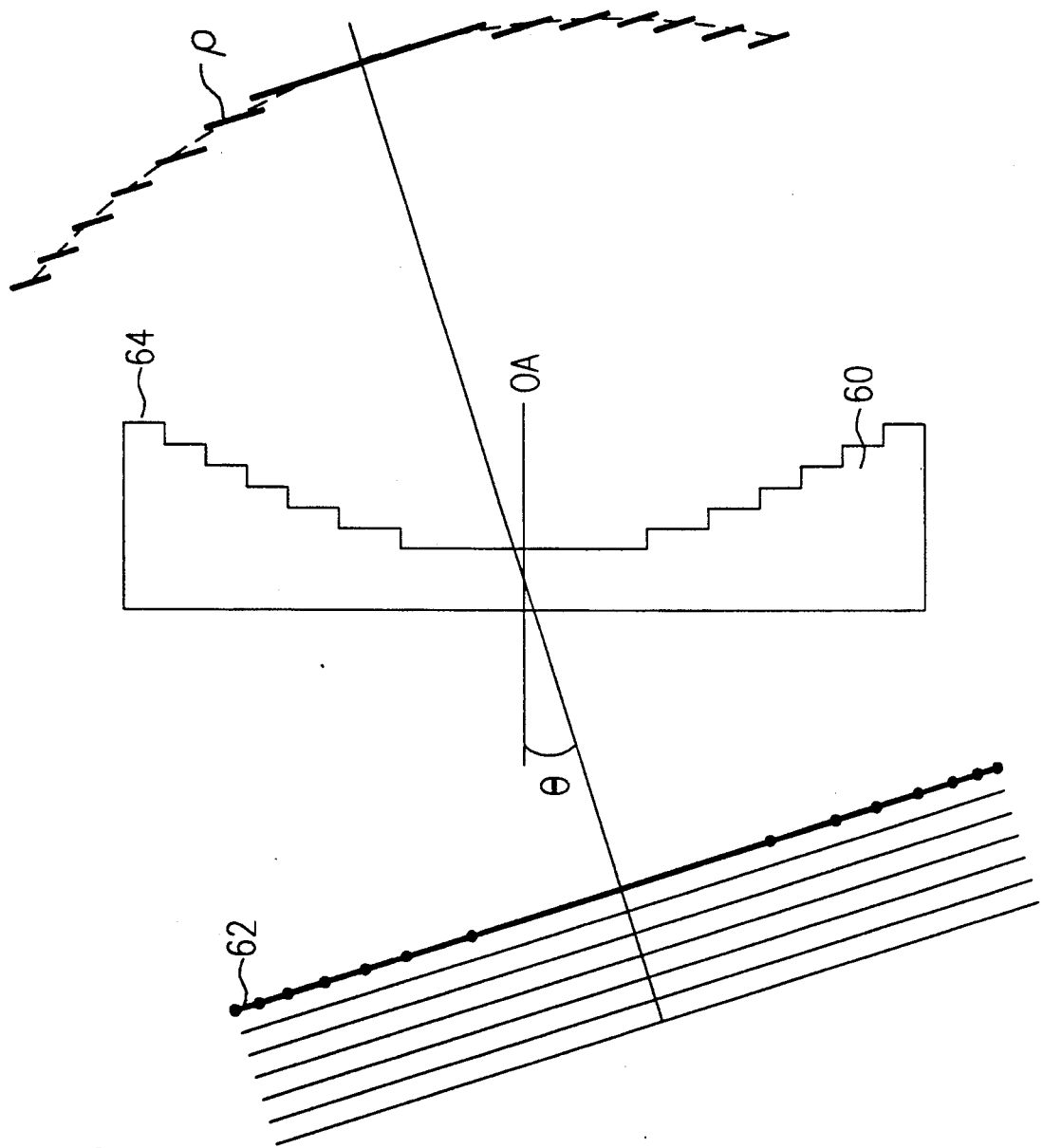
FIG. 6 illustrates the utilization of the plano-concave field curvature corrective lens of FIG. 5 to provide a predetermined field curvature $\rho$ to an off-axis wavefront.

FIG. 6 illustrates the utilization of a plano-concave field curvature corrective lens 60 with an off-axis wavefront, denoted 62. As with the arrangement illustrated in FIG. 4, the off-axis angle θ relative to the optical axis OA is exaggerated in FIG. 6 for the sake of illustration. Lens 60, in this example, comprises a plurality of seven zones arrangement to provide an inward field curvature ρ which is determined to essentially cancel an inherent field curvature −ρ.

Figure 7:
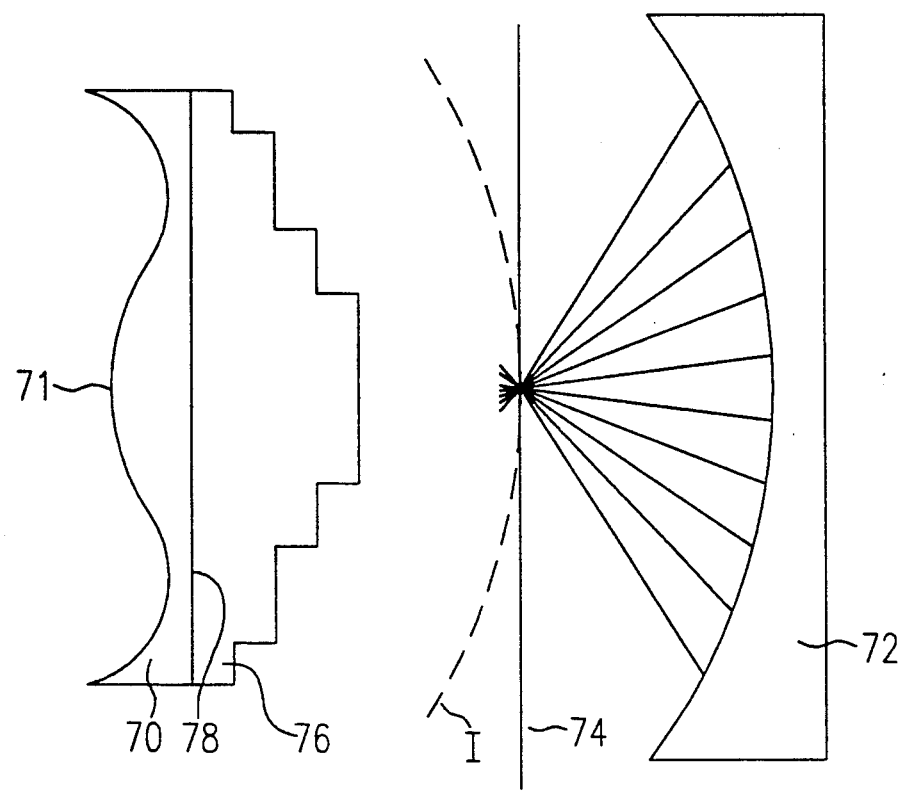
FIG. 7 illustrates an exemplary imaging system in the form of a Schmidt camera including a powerless plano-convex field curvature corrective lens of the present invention.
Figure 8:
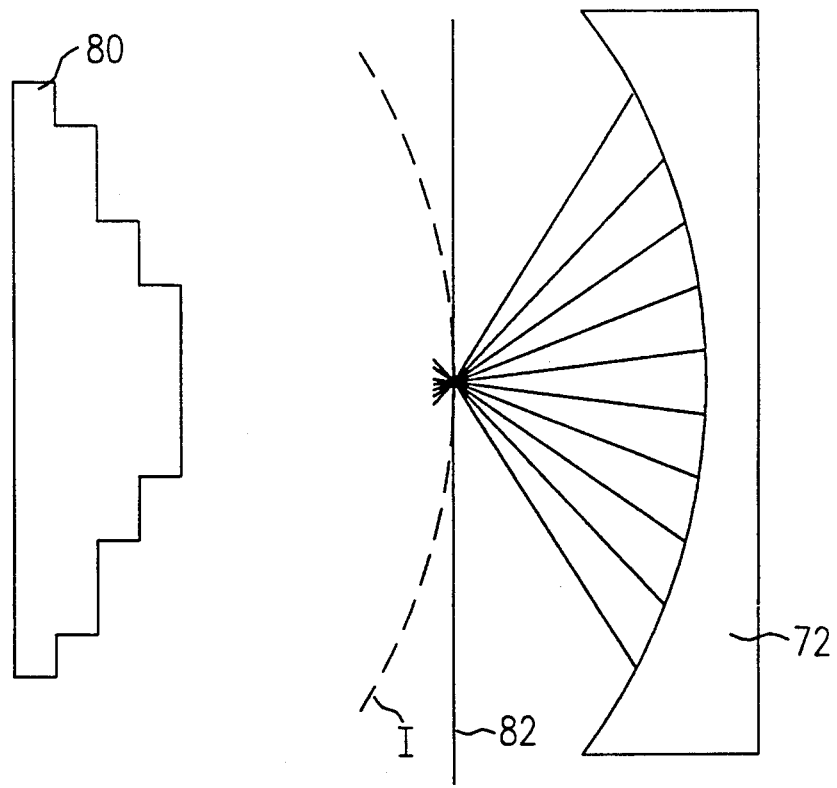
FIG. 8 illustrates an alternative Schmidt camera imaging system incorporating the characteristics of an spheric plate with a powerless plano-convex field curvature corrective lens formed in accordance with the teachings of the present invention.

As mentioned above, a field curvature corrective lens of the present invention may be incorporated into many existing optical systems to correct for inherent field curvature. One exemplary use is in association with a Schmidt camera, as shown in FIG. 7. A conventional Schmidt camera utilizes an aspheric plate 70 to correct for the spherical aberration of a spherical mirror 72. A wide corrected field of view can be obtained, since plate 70 is located at the center of curvature of mirror 72. However, the image I will exhibit inward field curvature, as shown by the dotted line I in FIG. 7, due to the nature of mirror 72. Field curvature may be corrected, therefore, by utilizing a powerless field curvature corrective lens 76 formed in accordance with the teachings of the present invention. For the particular embodiment of FIG. 7, a plano-convex field curvature corrective lens 76 is utilized, since the reflected signal will comprise an opposite curvature to that imparted by mirror 72. The relative placement of plate 70 and lens 76 in the optical system is unimportant. However, the ability to form field curvature corrective lens 76 on the plano surface 78 of aspheric plate 70 allows for simplification of the resulting arrangement, as well as providing inherent alignment between the two devices. The arrangement of FIG. 7 illustrates plate 70 and lens 76 formed as an integral unit. In an alternative embodiment, the aspheric properties of plate 70 may be incorporated into the stepped profile of lens 76 such that a single device may be utilized in place of plate 70 and lens 76. FIG. 8 illustrates an exemplary device 80 which is formed to provide such a modified stepped profile. As with the arrangement of FIG. 7, the utilization of corrective device 80 results in the projection of an essentially flat image field along surface 82.

Figure 9:
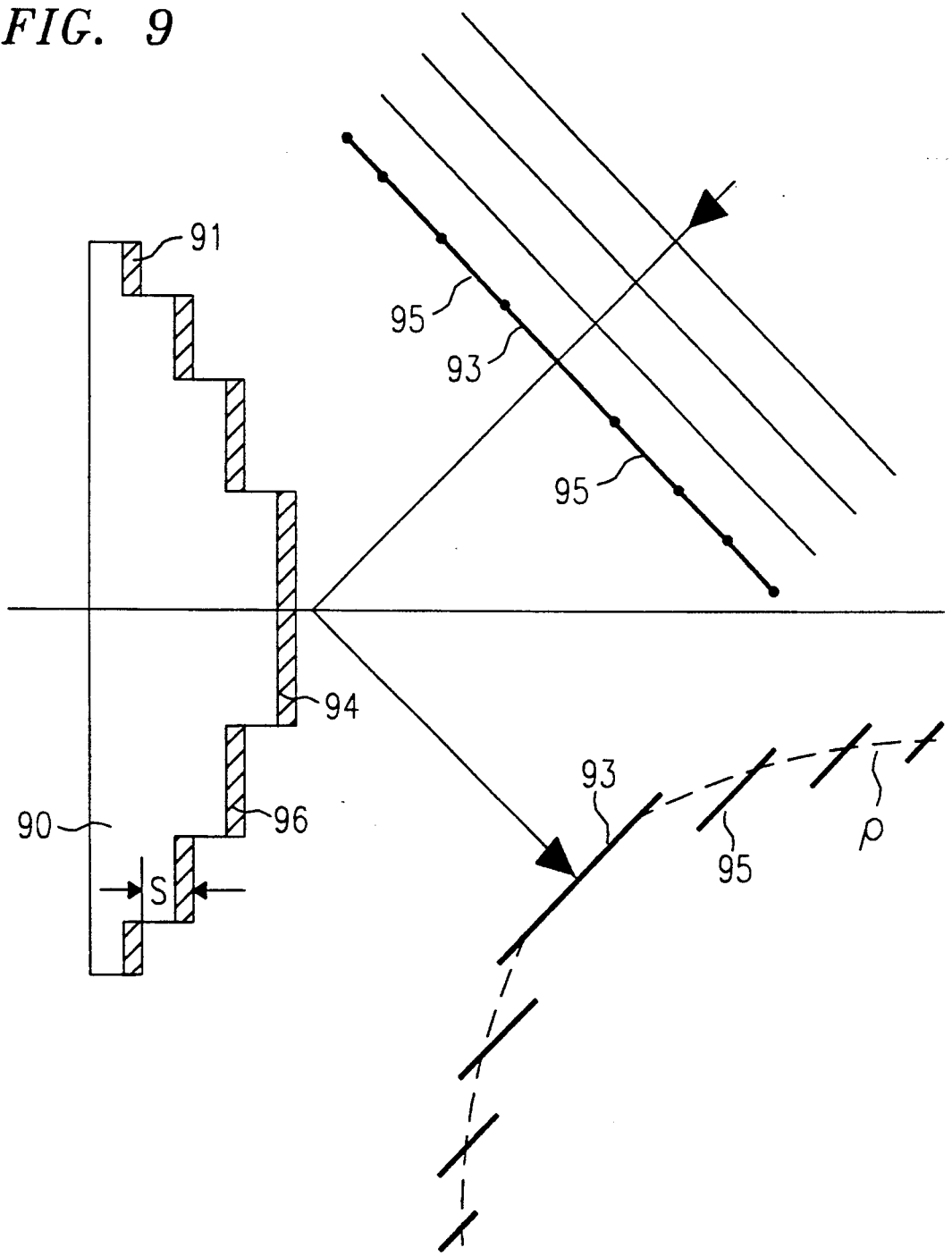
FIG. 9 illustrates an alternative imaging system utilizing a reflective plano-convex field curvature corrective lens formed in accordance with the teachings of the present invention.

The field flattening property of the present invention may also be used in a reflective arrangement, as illustrated in FIG. 9. A reflective plano-convex field curvature corrective device 90 is positioned to intercept an off-axis wavefront 92. As shown, device 90 comprises a plano-convex arrangement, similar to plano-convex lens 70 of FIG. 7. In particular, device 90 comprises a plurality of zones 94, 96, each of a predetermined step size S. The step size and number of zones thus determining the lens curvature R required to impart desired field corrective curvature ρ. In contrast to previous arrangements, however, device 90 further comprises a reflective coating 91 disposed over the surface of each zone 94, 96 in the manner depicted in FIG. 9. Therefore, incoming wavefront 92 (presumably comprising little, if any, curvature) will be reflected in a staggered fashion as shown. That is, the portion 93 of wavefront 92 intercepting top plate 94 will be reflected first, portion 95 intercepting plate 96 will follow, and so on. The emerging wavefront 92' from device 90 will thus exhibit a field curvature ρ as shown. Since device 90 is configured to provide a field curvature opposite to that inherent in the imaging system, the resulting focused image (not shown) will be essentially flat. Alternative to this plano-convex reflective arrangement, a reflective plano-concave powerless field curvature corrective lens may be utilized in arrangements where it is required to introduce phase advance to overcome inherent field curvature.

It is to be understood that the powerless field curvature correcting arrangement of the present invention is capable of being used in a myriad of applications, ranging from microscope objectives to telecentric communication systems—essentially in any optical imaging system which experiences field curvature.

As mentioned above, the powerless lens arrangement of the present invention may also be used to correct for spherical aberration. Spherical aberration, as described above, arises from the lack of perfect imaging with spherical lenses and results in a quartic-type aberration. A lens stepped profile suitable for providing spherical aberration correction can be defined by:

$$\text{lensprofile} = R - \sqrt{R^2 - y^2} + Ay^4.$$

The introduction of the quartic term $Ay^4$ results in modifying the step height to form a lens capable of spherical aberration correction.

A powerless corrective lens of the present invention may be formed with a lens curvature R designed to correct for both field curvature and spherical aberration. In this case, the curvature of the lens would be derived from an equation containing both circular and quartic terms, where the squared terms are related to field curvature and the quadratic term is related to spherical aberration. In general, since the lens curvature R is physically determined by adjusting the step height S of the lens, virtually any desired curvature may be approximated with the powerless lens of the present invention.

I claim:

1. An optical imaging system for use with an optical signal of a known wavelength, said optical system including means for correcting inherent optical aberrations, the correction means comprising
a plano-based device including a plurality of N stepped zones determined to approximate a desired device curvature R for re-arranging said optical signal passing therethrough into a plurality of annular wavefront sections so as to introduce a predetermined, different phase delay of at least $2\pi$ to each wavefront section, the re-arrangement of wavefront sections for essentially canceling selected inherent optical aberrations.

2. An optical imaging system as defined in claim 1 wherein the correction means is capable of essentially canceling the selected aberration of inherent field curvature, the plano-based device comprising a plurality of zones wherein each zone has an essentially identical step height S chosen to be a $2\pi$ multiple of the known wavelength of the optical signal so as to introduce a field curvature approximately opposite in magnitude to the inherent field curvature.

3. An optical imaging system as defined in claim 1 wherein the correction means is capable of essentially canceling the selected aberration of inherent spherical aberration, the plano-based device comprising a plurality of zones wherein each zone is configured to provide a step height adjusted to form an essentially quadratic stepped profile so as to introduce a spherical aberration approximately opposite in magnitude to the inherent spherical aberration.

4. An optical imaging system as defined in claim 1 wherein each stepped zone of the plano-based device is configured to include a first face parallel to the plano surface and a second face perpendicular to the plano surface such that essentially no optical power is imparted to the optical signal passing therethrough.

5. A system as defined in claim 1 wherein the plano-based device comprises a plano-convex device.

6. A system as defined in claim 1 wherein the plano-based device comprises a plano-concave device.

7. A system as defined in claim 1 wherein the plano-based device is an optically transparent device.

8. A system as defined in claim 1 wherein the plano-based device is an optically reflective device.

9. An optical corrective lens for use with an optical signal of a known wavelength and providing compensation to an optical image exhibiting an inherent aberration, the corrective lens comprising
 a plano-based device including a plurality of N stepped zones for introducing a predetermined plurality of N phase delays of a multiple of $2\pi$ to an optical signal passing therethrough, the plurality of N phase delays chosen to provide at the output of said plano-based device a curvature essentially opposite to that created by the inherent aberration.

10. An optical corrective lens as defined in claim 9 wherein each stepped zone comprises is configured to include a first face parallel to the plano surface of the plano-based device and a second face perpendicular to said plano surface.

11. An optical corrective lens as defined in claim 9 wherein field curvature correction is provided.

12. An optical corrective lens as defined in claim 11 wherein the each zone forming the plano-based device comprises an essentially identical step height S chosen to be a $2\pi$ multiple of the known wavelength of the optical signal passing therethrough so as to form a corrective lens with a squared curvature R capable of essentially canceling the inherent system field curvature.

13. An optical corrective lens as defined in claim 9 wherein spherical aberration correction is provided.

14. An optical corrective lens as defined in claim 13 wherein each zone forming the plano-based device comprises a step height S chosen to form a lens profile with a quadratic curvature capable of essentially canceling the inherent spherical aberration.

15. An optical corrective lens as defined in claim 9 wherein both field curvature and spherical aberration correction is provided.

16. An optical corrective lens as defined in claim 15 wherein each zone forming the plano-based device comprises a step height S chosen to form a lens profile with a curvature R including both circular and quartic terms.

17. An optical corrective lens as defined in claim 9 wherein the plano-based device comprises a plano-convex device.

18. An optical corrected lens defined in claim 9 wherein the plano-based device comprises a plano-concave device.

19. An optical corrective lens as defined in claim 9 wherein the plano-based device is an optically transparent device.

20. An optical corrective lens as defined in claim 9 wherein the plano-based device is an optically reflective device.

* * * * *